United States Patent
Sugumar et al.

(10) Patent No.: US 7,065,635 B1
(45) Date of Patent: Jun. 20, 2006

(54) METHOD FOR HANDLING CONDITION CODE MODIFIERS IN AN OUT-OF-ORDER MULTI-ISSUE MULTI-STRANDED PROCESSOR

(75) Inventors: Rabin A. Sugumar, Sunnyvale, CA (US); Sorin Iacobovici, San Jose, CA (US); Chandra M. R. Thimmannagari, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 357 days.

(21) Appl. No.: 10/738,576

(22) Filed: Dec. 17, 2003

(51) Int. Cl.
  *G06F 9/38* (2006.01)
(52) U.S. Cl. .................... 712/228; 712/217
(58) Field of Classification Search ............... 712/217, 712/228
  See application file for complete search history.

(56) References Cited

U.S. PATENT DOCUMENTS 5,838,988 A * 11/1998 Panwar et al. ............. 712/32
5,983,335 A * 11/1999 Dwyer, III ................. 712/23
6,219,778 B1 * 4/2001 Panwar et al. ............. 712/23
2002/0038416 A1 * 3/2002 Fotland et al. ............ 712/228
2003/0093655 A1 * 5/2003 Gosior et al. .............. 712/228

* cited by examiner

*Primary Examiner*—William M. Treat
(74) *Attorney, Agent, or Firm*—Osha-Liang LLP

(57) ABSTRACT

A technique for handling a condition code modifying instruction in an out-of-order multi-stranded processor involves providing a condition code architectural register file for each strand, providing a condition code working register file, and assigning condition code architectural register file identification information (CARF_ID) and condition code working register file identification information (CWRF_ID) to the condition code modifying instruction. CARF_ID is used to index a location in a condition code rename table to which the CWRF_ID is stored. Thereafter, upon an exception-free execution of the condition code modifying instruction, a result of the execution is copied from the condition code working register file to the condition code architectural register file dependent on CARF_ID, CWRF_ID, register type information, and strand identification information.

15 Claims, 4 Drawing Sheets

METHOD FOR HANDLING CONDITION CODE MODIFIERS IN AN OUT-OF-ORDER MULTI-ISSUE MULTI-STRANDED PROCESSOR

BACKGROUND OF INVENTION

A typical computer system includes at least a microprocessor and some form of memory. The microprocessor has, among other components, arithmetic, logic, and control circuitry that interpret and execute instructions necessary for the operation and use of the computer system. FIG. 1 shows a typical computer system 10 having a microprocessor 12, memory 14, integrated circuits (IC) 16 that have various functionalities, and communication paths 18 and 20, i.e., buses and wires, that are necessary for the transfer of data among the aforementioned components of the computer system 10.

Improvements in microprocessor (e.g., 12 in FIG. 1) performance continue to surpass the performance gains of their memory sub-systems. Higher clock rates and increasing number of instructions issued and executed in parallel account for much of this improvement. By exploiting instruction level parallelism, microprocessors are capable of issuing multiple instructions per clock cycle. In other words, such a "multi-issue" microprocessor is capable of dispatching, or issuing, multiple instructions each clock cycle to one or more pipelines in the microprocessor.

SUMMARY OF INVENTION

According to one aspect of one or more embodiments of the present invention, a method for handling a plurality of instructions in a multi-stranded microprocessor pipeline comprises (1) providing a condition code architectural register file for each strand and a condition code working register file, (2) determining whether there is a condition code modifying instruction in the plurality of instructions, and (3) if there is a condition code modifying instruction: (i) assigning condition code architectural register file identification information to the condition code modifying instruction, (ii) assigning condition code working register file identification information to the condition code modifying instruction, (iii) providing register type information and strand identification information, (iv) indexing a storage location with the condition code architectural register file identification information and strand identification information, (v) storing the condition code working register file identification information in the location, (vi) executing the condition code modifying instruction, and (vii) storing a result of the executing in the condition code working register file dependent on the condition code working register file identification information and register type information.

According to one aspect of one or more embodiments of the present invention, a method for handling a plurality of instructions in a multi-stranded microprocessor pipeline comprises (1) step for providing a condition code architectural register file for each strand and a condition code working register file, (2) step for determining whether there is a condition code modifying instruction in the plurality of instructions, and (3) if there is a condition code modifying instruction: (i) step for assigning condition code architectural register file identification information to the condition code modifying instruction, (ii) step for assigning condition code working register file identification information to the condition code modifying instruction, (iii) step for providing register type information and strand identification information, (iv) step for indexing a storage location with the condition code architectural register file identification information and the strand identification information, (v) step for storing the condition code working register file identification information in the location, (vi) step for executing the condition code modifying instruction, and (vii) step for storing a result of the executing in the condition code working register file dependent on the condition code working register file identification information and register type information.

According to one aspect of one or more embodiments of the present invention, a multi-stranded microprocessor comprises (1) an instruction decode unit arranged to decode a plurality of instructions, (2) an execution unit having a condition code architectural register file for each strand and a condition code working register file, where, if the instruction decode unit determines that there is a condition code modifying instruction in the plurality of instructions, the instruction decode unit is further arranged to (i) assign condition code architectural register file identification information, condition code working register file identification information, register type information and strand identification information to the condition code modifying instruction, and (3) a rename and issue unit operatively connected to the instruction decode unit and the execution unit, where the rename and issue unit is arranged to store the condition code working register file identification information in a storage location indexed by the condition code architectural register file identification information and the strand identification information, where the execution unit is arranged to execute the condition code modifying instruction and store a result of the execution in the condition code working register file, and where the result is copied to the appropriate condition code architectural register file dependent upon a status of the execution.

Other aspects and advantages of the invention will be apparent from the following description and the appended claims.

DETAILED DESCRIPTION

Figure 1:
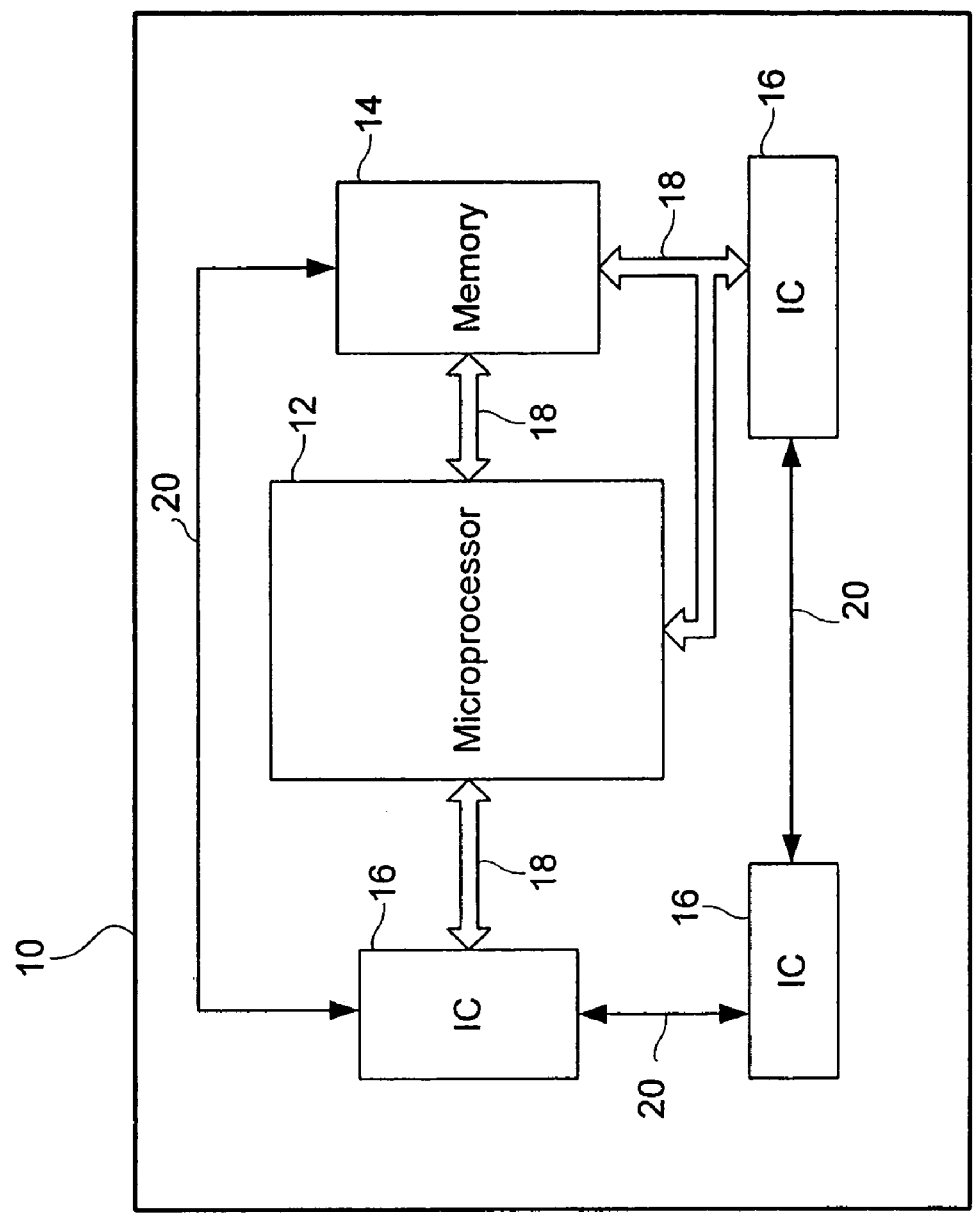
FIG. 1 shows a typical computer system.
Figure 2:
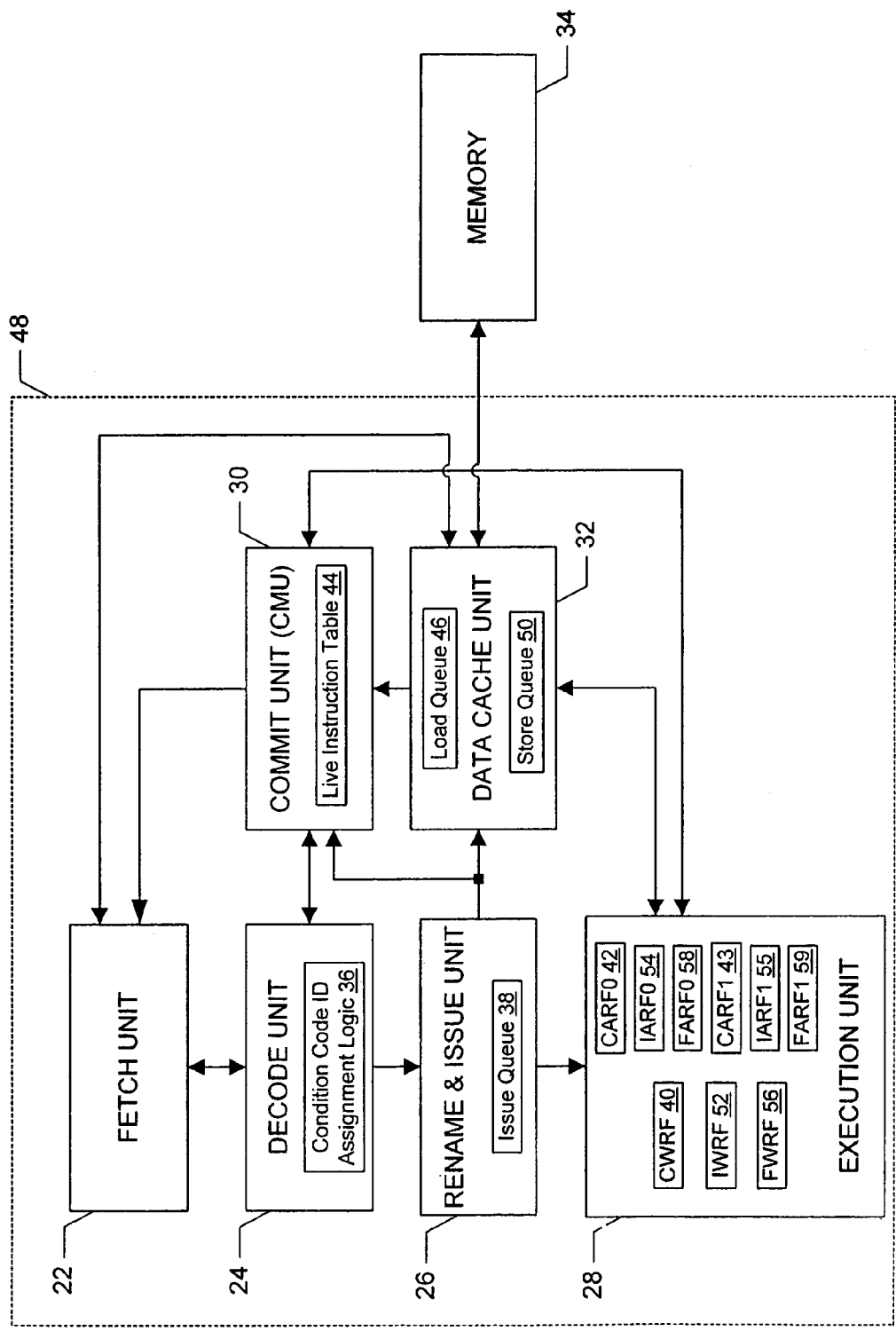
FIG. 2 shows a block diagram of a portion of a microprocessor in accordance with an embodiment of the present invention.

FIG. 2 shows an exemplary pipeline of a multi-stranded processor 48 in accordance with an embodiment of the present invention. The microprocessor 48 includes the following functional units: an instruction fetch unit (IFU) 22; an instruction decode unit (IDU) 24 having condition code ID assignment logic 36; a rename and issue unit (RIU) 26 having an issue queue 38; an instruction execution unit 28 having a condition code working register file (CWRF) 40, an integer working register file (IWRF) 52, a floating-point working register file (FWRF) 56, a condition code architectural register file for strand 0 (CARF0) 42, a condition code architectural register file for strand 1 (CARF1) 43, an integer architectural register file for strand 0 (IARF0) 54, an integer architectural register file for strand 1 (IARF1) 55, a floating-point architectural register file for strand 0 (FARF0) 58, and a floating-point architectural register file for strand 1 (FARF1) 59; a commit unit 30 having a live instruction table (LIT) 44; and a data cache unit (DCU) 32 having a load queue 46 and a store queue 50.

Note that any of the above functional units may further be described by internal pipeline(s); be subdivided into a number of sub-units; and/or use more than one processing stage, e.g., clock cycle, to complete the tasks handled by each functional unit. Those skilled in the art will also appreciate that the pipeline may include more or less functional units than shown without departing from the scope of the present invention.

Referring to FIG. 2, the instruction fetch unit 22 is designed to fetch instructions from the strands being processed using a set of instruction buffers (not shown). The group of instructions fetched by the instruction fetch unit 22 is often referred to as an "instruction fetch bundle." The instruction fetch unit 22 includes at least as many instruction buffers as a maximum number of strands that the microprocessor 48 is designed to process. For example, in some embodiments, the microprocessor 48 may be designed to process a maximum of two strands. Thus, the instruction fetch unit 22 includes at least two instruction buffers (one for each strand) that may each fetch a bundle of instructions, i.e., a fetch group, from an assigned strand. The maximum number of instructions that may be included in an instruction fetch bundle is predetermined by a design, i.e., an architecture, of the microprocessor 48. In some embodiments, an instruction fetch bundle may include three instructions. Accordingly, in such exemplary embodiments, the instruction fetch unit 22 fetches 3 instructions every clock cycle.

In the instruction decode unit 24, the instruction fetch bundles pulled from the instruction buffers are decoded sequentially. Thus, the instructions in a first instruction fetch bundle are decoded before proceeding to the instructions in a second instruction fetch bundle. In the embodiment shown in FIG. 2, each instruction fetch bundle is decoded using two internal processing stages that are each responsible for partial decoding of an instruction.

In general, the tasks that are completed during a first internal processing stage, referred to herein as D1, include: breaking complex instructions into simple instructions; killing delay slot instructions for certain branch conditions; identifying valid instructions and managing queue resources; looking for front end stall conditions; and determining strand switch conditions. The tasks that are completed during a second internal processing stage, referred to herein as D2, include: identifying type variables (i.e., integer type, operation type, etc.) associated with valid instructions; assigning IDs to the valid instructions; and handling strand switches and stalls resulting from resource scarcity. The condition code ID assignment logic 36 in the instruction decode unit 24 is responsible for assigning condition code working register file identification information (CWRF_ID) and condition code architectural register file identification information (CARF_ID) to condition code modifying instructions. The instruction decode unit 24 also provides register type information and strand identification information (strand ID) for each valid instruction. The register type information indicates to units down the pipeline whether the instruction results in updating an integer register or a floating-point register or a condition code register or both an integer register and a condition code register or both a floating-point register and a condition code register. The strand identification information indicates to units down the pipeline which strand(s) instructions belong to (that is, strand ID=0 refers to stand 0, strand ID=1 refers to strand 1).

Those skilled in the art will understand that a processor in accordance with embodiments of the present invention may have any number of strands.

Decoded, valid instructions are passed to the both the commit unit 30 and the rename and issue unit 26. In the commit unit 30, the instructions are used to update the live instruction table 44, i.e., an instruction table that stores a copy of each active, valid instruction in the pipeline. The number of valid instructions that may be stored by the live instruction table 44 is predetermined by the design of the microprocessor 48. In the embodiment shown in FIG. 2, the live instruction table 44, the issue queue 38, the load queue 46, the CWRF 40, IWRF 52, and FWRF 56 each store an equal number of instructions. These structures are shared between strands in a multi-strand mode.

In the rename and issue unit 26, the instructions are renamed, picked, and issued to the instruction execution unit 28. The tasks completed during the rename stage include: renaming source registers and updating rename tables. The tasks completed during the pick stage include: monitoring a ready status of instructions in the issue queue 38; prioritizing the instructions that have a ready status; and selecting a number of instructions for issue. The number of instructions selected for issue is predetermined by the design of the microprocessor 48, and, in the embodiment shown in FIG. 2, is equal to the number of instructions that are included in a fetch group. During the issue stage, instructions selected for issue are forwarded from the issue queue 38 to the instruction execution unit 28.

Note that some types of operations may require that data be loaded from a memory 34 in order to execute the instruction. For instructions that include these types of operations, a load request is generated to the data cache unit 32, which is responsible for loading data from a cache portion of the data cache unit 32 using the load queue 46. In the case of a cache miss, the data cache unit 32 loads the requested data from the memory 34 using the load queue 46. The data may then be loaded from the load queue 46 into the instruction execution unit 28 for use in the instruction's execution.

The instruction execution unit 28 includes various computation units, i.e., an arithmetic logic unit, a shifter, a multiplier/divider, a branch execution unit, etc., that are used to execute the instructions. Each instruction is executed by the computational unit designed to handle that instruction's particular operation type, e.g., an instruction identified as a multiplication operation is handled by the multiplier/divider. Once an instruction has been executed, the results of the computation are written into a register of the condition code working register file (CWRF) 40, the integer working register file (IWRF) 52, or the floating-point working register file (FWRF) 56 based on its register type. Further, a status, or completion report is generated to the commit unit 30.

In the commit unit 30, instructions that have completed without exceptions are retired from active status and computational results are committed to architectural memory based on data received from the instruction decode unit 24 and completion reports. In the embodiment shown in FIG. 2, retirement and commitment is performed using three processing stages: an entry stage, a retire stage, and a commit stage.

During the entry stage, the commit unit 30 tags completed instructions for retirement by writing the completion report data to the live instruction table 44. Then, during the retire stage, the commit unit 30 selects a group of tagged instructions which have completed without exceptions to retire and signals the appropriate functional units, e.g., the instruction decode unit 24, the rename and issue unit 26, and/or the instruction execution unit 28, that the instructions are to be committed. In the embodiment shown in FIG. 2, instructions are retired according to age, i.e., older instructions retire first. Next, during the commit stage, the architectural state of each tagged instruction is committed by writing the associated computation results from the desired working register file(s) (40, 52, or 56) to a register of the desired architectural register file(s) (42, 43, 54, 55, 58, or 59) based on its register type and strand ID.

As mentioned above, the data cache unit 32 loads/stores data to/from the cache/memory 34 based on load/store requests received from the instruction execution unit 28. Load requests are handled using the load queue 46, while store requests are handled using both the load queue 46 and the store queue 50. In the case of a store request, the data cache unit 32 loads the memory address, i.e., the physical location in the memory 34, and hit/miss information for the store instruction sitting in the load queue 46 into the store queue 50. Then, once the store instruction is ready to be committed, the data to be stored to the cache/memory 34 is loaded into the store queue 50. The data may then be forwarded from the store queue 50 to the cache/memory 34 when the store instruction is completed.

When the instruction fetch unit 22 forwards a group of instructions, the instruction decode unit 24 flops, or stores, the instructions at the beginning of the current clock cycle. In this current clock cycle, the instruction decode unit 24 decodes the instructions in the instruction fetch bundle forwarded from the instruction fetch unit 22 to determine if there are any condition code modifying instructions. Those skilled in the art will understand that a condition code modifying instruction is an instruction that affects a value of a condition code register, i.e., a register that stores a comparison result.

If there are any condition code modifying instructions, the instruction decode unit 24 assigns a condition code architectural register file ID (CARF_ID) and a condition code working register file ID (CWRF_ID) to the condition code modifying instruction(s). More specifically, dependent on the detection of one or more condition code modifying instructions, the instruction decode unit 24 assigns the condition code architectural register file IDs (CARF_IDs) and condition code working register file IDs (CWRF_IDs) to any valid instructions that result in a modification of any one of a particular group of condition code registers. The instruction decode unit 24 provides register type information that indicates to units down the pipeline whether the instructions results in the updating of one of the condition code registers and strand identification information that indicates to units down the pipeline which strand(s) these instructions belong to. The bit field of the condition code architectural register file ID is dependent on the number of condition code registers in the particular group of condition code registers. For example, consider for an exemplary embodiment of the present invention a group of 8 condition code registers. Because an instruction can modify one of the 8 condition code registers, the condition code architectural register file ID is a 3-bit field. Further assume that in this exemplary embodiment, the microprocessor 48 can support a 32 entry condition code working register file, i.e., at any given time, there could be a maximum of 32 live condition code modifying instructions in a pipeline. In essence, assigning the condition code working register file ID to condition code modifying instructions results in the renaming of the condition code modifying instruction's condition code architectural register file 42 to one a number of free physical registers (i.e., one of the entries in the condition code working register file).

The 3-bit (for the support of 8 possible condition code registers) condition code architectural register file ID and the 5-bit (for support of 32 entries) condition code working register file ID, along with the instruction opcode, register type information, and strand identification information, gets forwarded to the rename and issue unit 26. In one exemplary embodiment of the present invention, the rename and issue unit 26 maintains an 8-entry condition code rename table for each strand. Once the rename and issue unit 26 receives an instruction that results in the modifying of one of the condition code registers, the rename and issue unit 26 accesses an entry in the condition code rename table using the 3-bit condition code architectural register file ID (CARF_ID) and strand ID as its index. The rename issue unit 26 then updates the indexed entry with the new 5-bit condition code working register file ID (CWRF_ID) forwarded by the instruction decode unit 24. Accordingly, the condition code rename table helps the rename and issue unit 26 rename condition code sourcing instructions (that is, instructions that use condition code registers as one of its source operands).

For example, in the case of an occurrence of a condition code modifying instruction, if the instruction decode unit 24 forwards '000' (0 in base 10) for the condition code architectural register file ID (CARF_ID), '10110' (22 in base 10) for the condition code working register file ID (CWRF_ID), and '0' for strand ID, the rename and issue unit 26 updates entry 0 of the condition code rename table with 22. The condition code modifying instruction then goes and waits in an issue queue 38 for it to be issued to the execution unit 28. Once the rename and issue unit 26 determines that this condition code modifying instruction is ready to be issued (i.e., it is dependency free), the condition code modifying instruction gets issued to the execution unit 28. The execution unit 28 executes the condition code modifying instruction and writes the result into the condition code working register file 40 dependent on the condition code working register file ID (CWRF_ID), which happens to be located in the execution unit 28. In the exemplary embodiment currently being described, the execution unit 28 uses the 5-bit condition code working register file ID (CWRF_ID) appended to the condition code modifying instruction as an index into the condition code working register file 40.

Those skilled in the art will understand that, in one or more embodiments, the execution unit 28 may send a completion report to the commit unit 30 that includes execution and exception status. The instruction decode unit 24, when forwarding an instruction fetch bundle to the rename and issue unit 26, also forwards the instruction fetch bundle to the commit unit 30. In this case, the instruction decode unit 24 forwards the condition code architectural register file ID (CARF_ID), condition code working register file ID (CWRF_ID), register type information, strand ID information, and some predecode information. Once a retire pointer in the commit unit 30 points to the condition code modifying instruction, a determination is made as to whether the condition code modifying instruction has completed executing, perhaps using the completion report sent by the execution stage. Moreover, a determination is made as to whether any exceptions have resulted from the execution of the condition code modifying instruction.

Figure 3:
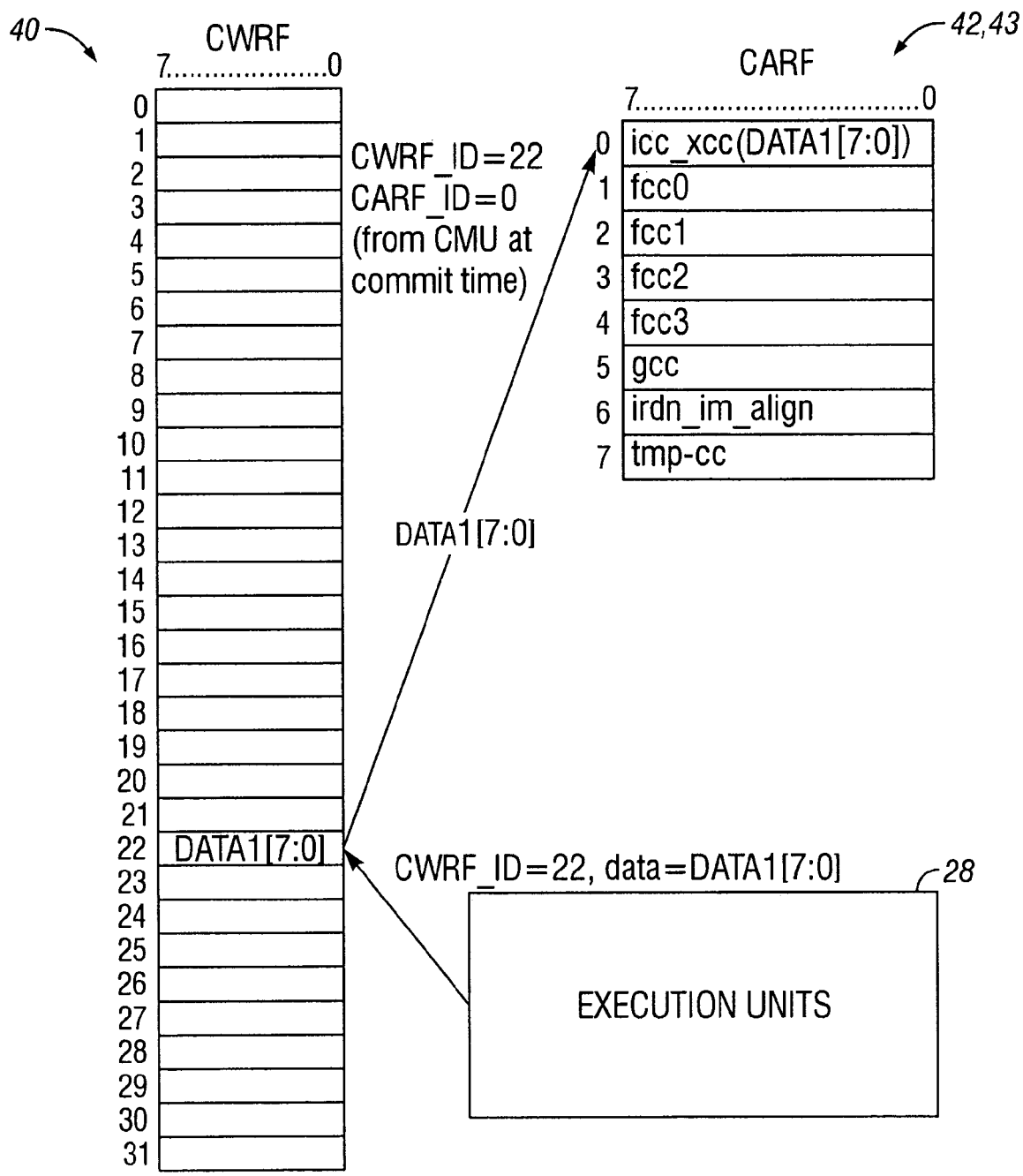
FIG. 3 shows data movement in accordance with an embodiment of the present invention.

Referring to FIG. 3, once it is determined that the condition code modifying instruction has executed without exception(s), the condition code modifying instruction is committed by writing the associated value in the condition code working register file (CWRF) 40 to the appropriate condition code architectural register file (CARF0 42 or CARF1 43). To do this, the commit unit 30 uses the condition code working register file ID (CWRF_ID), the condition code architectural register file ID (CARF_ID) and the strand identification information forwarded by the instruction decode unit (24 in FIG. 2) to index the condition code working register file 40 and one of the condition code architectural register files 42 or 43. Once the value is written into the condition code architectural register file 42 or 43, the corresponding entry in the condition code working register file 40 is free to be reassigned by the instruction decode unit (24 in FIG. 2) to a new condition code modifying instruction.

Figure 4:
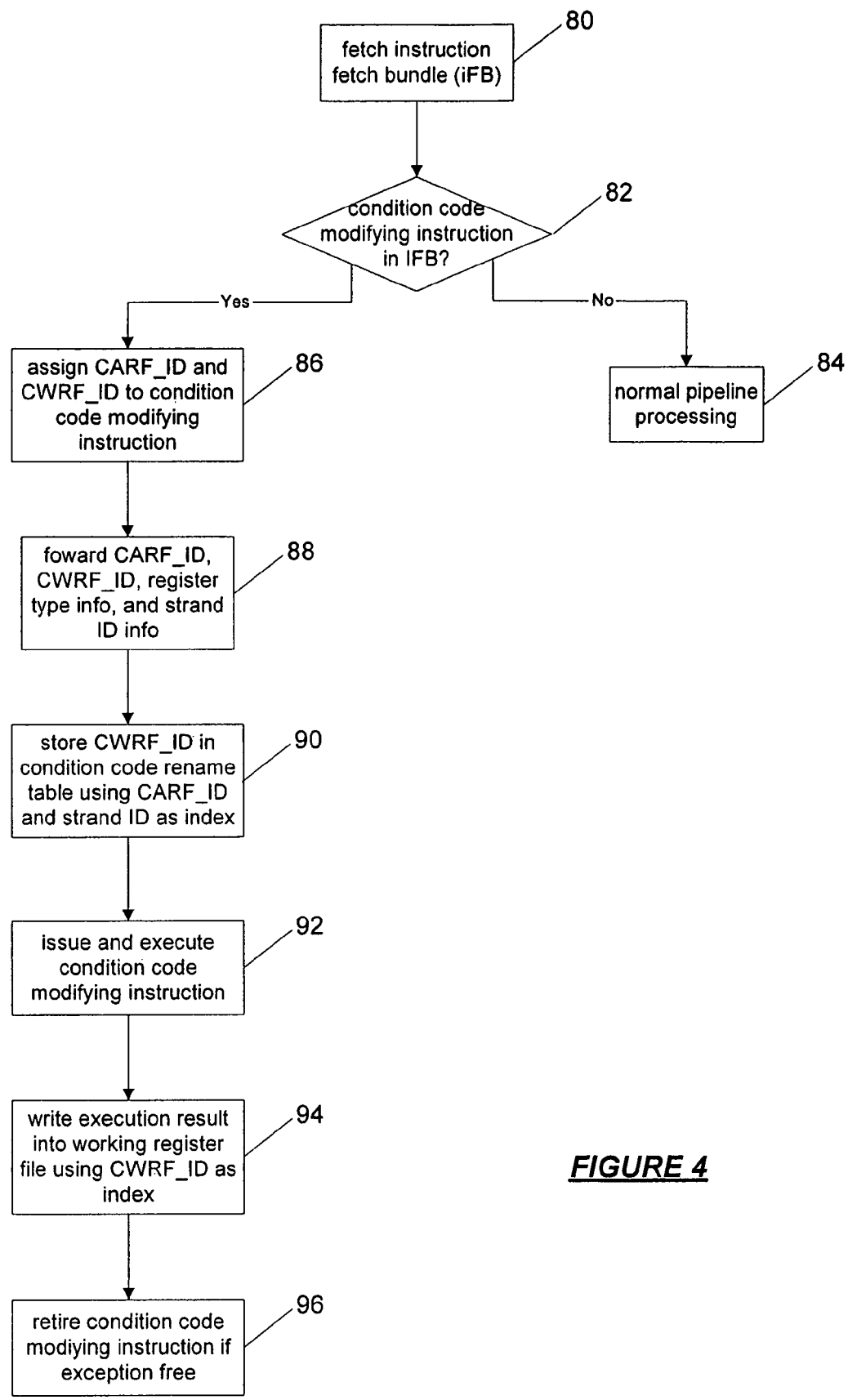
FIG. 4 shows a flow process in accordance with an embodiment of the present invention.

FIG. 4 shows an exemplary flow process in accordance with an embodiment of the present invention. In FIG. 4, an instruction fetch bundle is first fetched 80. Thereafter, a determination is made as to whether there is a condition code modifying instruction in the instruction fetch bundle 82. If there is no condition code modifying instruction in the instruction fetch bundle, normal pipeline processing occurs 84.

However, if there is a condition code modifying instruction in the instruction fetch bundle, condition code architectural register file identification information and condition code working register file identification information are assigned to the condition code modifying instruction 86. Then, the condition code modifying instruction, the condition code working register file identification information assigned to the condition code modifying instruction, and the condition code architectural register file identification information assigned to the condition code modifying instruction, along with register type information and strand ID information, are forwarded 88 so that the condition code working register file identification information may be stored in a location in a condition code rename table 90 indexed by the condition code architectural register file identification information and strand identification information.

Once the condition code modifying instruction is ready to be issued, the condition code modifying instruction is issued and executed 92. A result of this execution is stored into the condition code working register file 94 dependent on the condition code working register file identification information. Thereafter, if the execution of the condition code modifying instruction is determined to have executed without exceptions, the execution result is copied from the condition code working register file to the appropriate condition code architectural register file dependent on (i) the condition code working register file identification information assigned to the condition code modifying instruction, (ii) the condition code architectural register file identification information assigned to the condition code modifying instruction, and (iii) the strand ID assigned to the condition code modifying instruction, whereafter the condition code modifying instruction is then retired 96.

Those skilled in the art will understand that the steps shown in the flow process of FIG. 4 may occur in parallel or in overlap for more than one condition code modifying instruction. For example, if an instruction fetch bundle has more than one condition code modifying instruction, steps 86, 88, and 90 in the flow process shown in FIG. 4 will be executed in parallel for each of the condition code modifying instructions in the instruction fetch bundle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for handling a plurality of instructions in a multi-stranded microprocessor pipeline, comprising:
   providing a condition code architectural register file for each strand and a condition code working register file;
   determining whether there is a condition code modifying instruction in the plurality of instructions; and
   if there is a condition code modifying instruction:
   assigning condition code architectural register file identification information to the condition code modifying instruction,
   assigning condition code working register file identification information to the condition code modifying instruction,
   providing register type information and strand identification information,
   indexing a storage location with the condition code architectural register file identification information and strand identification information,
   storing the condition code working register file identification information in the location,
   executing the condition code modifying instruction, and
   storing a result of the executing in the condition code working register file dependent on the condition code working register file identification information and register type information.

2. The method of claim 1, further comprising fetching the plurality of instructions.

3. The method of claim 1, further comprising decoding the plurality of instructions, wherein the determining is dependent on the decoding.

4. The method of claim 1, further comprising indexing and storing the condition code working register file identification information.

5. The method of claim 1, further comprising issuing the condition code modifying instruction.

6. The method of claim 1, further comprising retiring the condition code modifying instruction dependent on whether the executing occurs without exceptions.

7. The method of claim 1, further comprising copying the result from the condition code working register file to the appropriate condition code architectural register file dependent on the condition code working register file identification information, condition code architectural register file identification information, register type information, and strand identification information.

8. A method for handling a plurality of instructions in a multi-stranded microprocessor pipeline, comprising:
   step for providing a condition code architectural register file for each strand and a condition code working register file;
   step for determining whether there is a condition code modifying instruction in the plurality of instructions; and
   if there is a condition code modifying instruction:
   step for assigning condition code architectural register file identification information to the condition code modifying instruction,
   step for assigning condition code working register file identification information to the condition code modifying instruction, step for providing register type information and strand identification information, step for indexing a storage location with the condition code architectural register file identification information and the strand identification information, step for storing the condition code working register file identification information in the location, step for executing the condition code modifying instruction, and step for storing a result of the executing in the condition code working register file dependent on the condition code working register file identification information and register type information.

9. The method of claim 1, further comprising step for indexing and step for storing the condition code working register file identification information.

10. The method of claim 1, further comprising step for copying the result from the condition code working register file to the appropriate condition code architectural register file dependent on the condition code working register file identification information, the condition code architectural register file identification information, register type information, and strand identification information.

11. A multi-stranded microprocessor, comprising:

an instruction decode unit arranged to decode a plurality of instructions;

an execution unit having a condition code architectural register file for each strand and a condition code working register file, wherein, if the instruction decode unit determines that there is a condition code modifying instruction in the plurality of instructions, the instruction decode unit is further arranged to assign condition code architectural register file identification information, condition code working register file identification information, register type information, and strand identification information to the condition code modifying instruction; and a rename and issue unit operatively connected to the instruction decode unit and the execution unit, wherein the rename and issue unit is arranged to store the condition code working register file identification information in a storage location indexed by the condition code architectural register file identification information and strand identification information, wherein the execution unit is arranged to execute the condition code modifying instruction and store a result of the execution in the condition code working register file, and wherein the result is copied to the appropriate condition code architectural register file dependent upon a status of the execution.

12. The microprocessor of claim 11, further comprising an instruction fetch unit operatively connected to the instruction decode unit and arranged to fetch the plurality of instructions.

13. The microprocessor of claim 11, wherein the rename and issue unit comprises a condition code rename table, and wherein the condition code rename table comprises the storage location.

14. The microprocessor of claim 11, further comprising a commit unit operatively connected to the instruction decode unit and arranged to retire the condition code modifying instruction dependent on the execution.

15. The microprocessor of claim 11, wherein the result of the execution is stored in the condition code working register file dependent on the condition code working register file identification information and register type information, and wherein the result is copied to the appropriate condition code architectural register file dependent on the condition code architectural register file identification information, register type information, and strand identification information.

* * * * *